(12) United States Patent
Berg et al.

(10) Patent No.: US 7,593,792 B2
(45) Date of Patent: Sep. 22, 2009

(54) VEHICLE INFORMATION SYSTEM WITH REMOTE COMMUNICATORS IN A NETWORK ENVIRONMENT

(75) Inventors: Frederick J. Berg, Auburn, MI (US); Timothy J. Bennett, Kawkawlin, MI (US); Alan C. Davis, Fenton, MI (US); Richard K. Riefe, Saginaw, MI (US); Ronald H. Dybalski, Oxford, MI (US); Timothy M. Phillips, Fenton, MI (US)

(73) Assignee: Delphi Technologies, Inc., Troy, MI (US)

(*) Notice: Subject to any disclaimer, the term of this patent is extended or adjusted under 35 U.S.C. 154(b) by 505 days.

(21) Appl. No.: 11/330,641

(22) Filed: Jan. 12, 2006

(65) Prior Publication Data

US 2006/0276940 A1    Dec. 7, 2006

Related U.S. Application Data

(60) Provisional application No. 60/686,320, filed on Jun. 1, 2005.

(51) Int. Cl.
G06F 17/00 (2006.01)
(52) U.S. Cl. ............................. 701/1; 701/2
(58) Field of Classification Search ............ 701/1–2; 455/3.06; 725/37, 52, 74–77, 80
See application file for complete search history.

(56) References Cited

U.S. PATENT DOCUMENTS

| | | | |
|---|---|---|---|
| 4,787,040 A | 11/1988 | Ames et al. | |
| 5,541,571 A | 7/1996 | Ochs et al. | |
| 5,555,502 A | 9/1996 | Opel | |
| 5,808,373 A | 9/1998 | Hamanishi et al. | |
| 5,821,935 A | 10/1998 | Hartman | |
| 6,020,654 A | 2/2000 | Chutorash | |
| 6,032,089 A | 2/2000 | Buckley | |
| 6,042,414 A | 3/2000 | Kunert | |
| 6,119,060 A | 9/2000 | Takayama et al. | |

(Continued)

FOREIGN PATENT DOCUMENTS

DE    103 21 118    11/2004

(Continued)

OTHER PUBLICATIONS

European Search Report dated Jun. 25, 2008.

*Primary Examiner*—Yonel Beaulieu
(74) *Attorney, Agent, or Firm*—Thomas N. Twomey

(57) ABSTRACT

An information system for a vehicle includes a computer for handling informational data. This information data includes vehicle data corresponding to operation of the vehicle and external data such as internet web pages and email. A primary display is connected to the computer and in a position to be viewed by a driver of the vehicle. A primary input device allows input to the computer and manipulation of the primary display. A plurality of remote communicators are also operatively connected to the computer and movable about the vehicle. Each of the remote communicators includes a secondary display and a secondary input device for sending input to the computer and manipulating the secondary display. The secondary input device is also programmed to control the primary display for manipulating the informational data that is displayed to the driver.

6 Claims, 6 Drawing Sheets

U.S. PATENT DOCUMENTS

| | | |
|---|---|---|
| 6,147,598 A | 11/2000 | Murphy et al. |
| 6,175,782 B1 | 1/2001 | Obradovich et al. |
| 6,246,935 B1 | 6/2001 | Buckley |
| 6,289,332 B2 | 9/2001 | Menig et al. |
| 6,344,801 B1 | 2/2002 | Aoki et al. |
| 6,359,554 B1 | 3/2002 | Skibinski et al. |
| 6,411,877 B2 | 6/2002 | Böckmann et al. |
| 6,415,224 B1 | 7/2002 | Wako et al. |
| 6,418,362 B1 | 7/2002 | Pierre et al. |
| 6,424,337 B1 | 7/2002 | Eriksson et al. |
| 6,427,115 B1 | 7/2002 | Sekiyama |
| 6,434,450 B1 | 8/2002 | Griffin, Jr. |
| 6,438,465 B2 | 8/2002 | Obradovich et al. |
| 6,449,535 B1 | 9/2002 | Obradovich et al. |
| 6,504,710 B2 | 1/2003 | Sutton et al. |
| 6,526,335 B1 | 2/2003 | Treyz et al. |
| 6,539,289 B2 | 3/2003 | Ogino et al. |
| 6,583,373 B2 | 6/2003 | Ketzer et al. |
| 6,587,758 B2 | 7/2003 | Obradovich et al. |
| 6,591,168 B2 | 7/2003 | Odinak et al. |
| 6,603,394 B2 | 8/2003 | Raichle et al. |
| 6,608,399 B2 | 8/2003 | McConnell et al. |
| 6,633,482 B2 | 10/2003 | Rode |
| 6,640,169 B2 | 10/2003 | Bergmann et al. |
| 6,700,219 B2 | 3/2004 | Hirschfeld et al. |
| 6,788,528 B2 | 9/2004 | Enners et al. |
| 6,939,155 B2 | 9/2005 | Postrel |
| 6,941,194 B1 | 9/2005 | Dauner et al. |
| 2001/0021887 A1 | 9/2001 | Obradovich et al. |
| 2002/0070851 A1 | 6/2002 | Raichle et al. |
| 2002/0082751 A1 | 6/2002 | Obradovich et al. |
| 2002/0156555 A1 | 10/2002 | Obradovich et al. |
| 2003/0004616 A1 | 1/2003 | Obradovich et al. |
| 2003/0085805 A1 | 5/2003 | Paulo |
| 2003/0120397 A1 | 6/2003 | Bergmann et al. |
| 2003/0139179 A1 | 7/2003 | Fuchs et al. |
| 2003/0200012 A1 | 10/2003 | Odinak et al. |
| 2005/0021190 A1 | 1/2005 | Worrell et al. |
| 2005/0197745 A1* | 9/2005 | Davis et al. .................. 701/1 |
| 2007/0143798 A1* | 6/2007 | Jira et al. .................. 725/62 |

FOREIGN PATENT DOCUMENTS

| | | |
|---|---|---|
| EP | 1 529 678 | 5/2005 |
| WO | 00/31606 | 6/2000 |

* cited by examiner

VEHICLE INFORMATION SYSTEM WITH REMOTE COMMUNICATORS IN A NETWORK ENVIRONMENT

CROSS-REFERENCE TO RELATED APPLICATIONS

This application claims the benefit of U.S. Provisional Patent Application Ser. No. 60/686,320 for a VEHICLE INFORMATION SYSTEM WITH REMOTE COMMUNICATOR IN A NETWORK ENVIRONMENT, filed on Jun. 1, 2005, which is hereby incorporated by reference in its entirety.

FIELD OF THE INVENTION

The subject invention relates generally to information systems for vehicles and specifically to information system for vehicles including a remote communication device.

BACKGROUND OF THE INVENTION

Information systems for vehicles are well known in the prior art. Examples of such systems are described in U.S. Pat. No. 5,555,502 to Opel (the '502 patent) and U.S. Pat. No. 6,427,115 to Sekiyama (the '115 patent).

The '502 patent discloses an information system for a vehicle. The information system includes a computer connected to the various systems of the vehicle for sending and receiving information from the various systems. The computer is also connected to an input device for receiving inputs from a driver of the vehicle and a display that is viewable by the driver. The driver uses the input device in conjunction with the screen to review vehicle information and adjust any adjustable settings.

The '115 patent discloses an information system for a vehicle with a remote communicator. A computer receives vehicle data relating to the vehicle operation and external data such as navigational information, email, etc. The computer is operatively connected to the remote communicator to send and receive information from the remote communicator. The remote communicator includes a display and allows a driver or an occupant to determine directions to a destination, read email, etc.

Although the information systems of the prior art are useful in disseminating information to the driver and occupants of the vehicle, there remains an opportunity to provide an information system which allows greater interaction and exchange of information between the driver and the occupant.

SUMMARY OF THE INVENTION AND ADVANTAGES

A vehicle information system comprises a computer for handling informational data. This information data includes vehicle data corresponding to operation of the vehicle and associated vehicle systems. A primary display is disposed in the vehicle in a position to be viewed by a driver of the vehicle. The primary display is operatively connected to the computer and changeably displays the informational data to the driver of the vehicle. A remote communicator is also operatively connected to the computer and movable about the vehicle. The remote communicator includes a secondary display for changeably displaying the informational data to an occupant of the vehicle. The remote communicator also includes a secondary input device for sending commands to the computer and controlling the secondary display. The secondary input device is also programmed to control the primary display for manipulating the informational data that is displayed to the driver.

Accordingly, the subject invention allows an occupant of the vehicle to locate information using the remote communicator and send the information to the driver of the vehicle via the primary display. This allows the driver of the vehicle to maintain focus on driving instead, while the occupant of the vehicle can handle distracting tasks such as finding directions, changing the radio station, etc.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
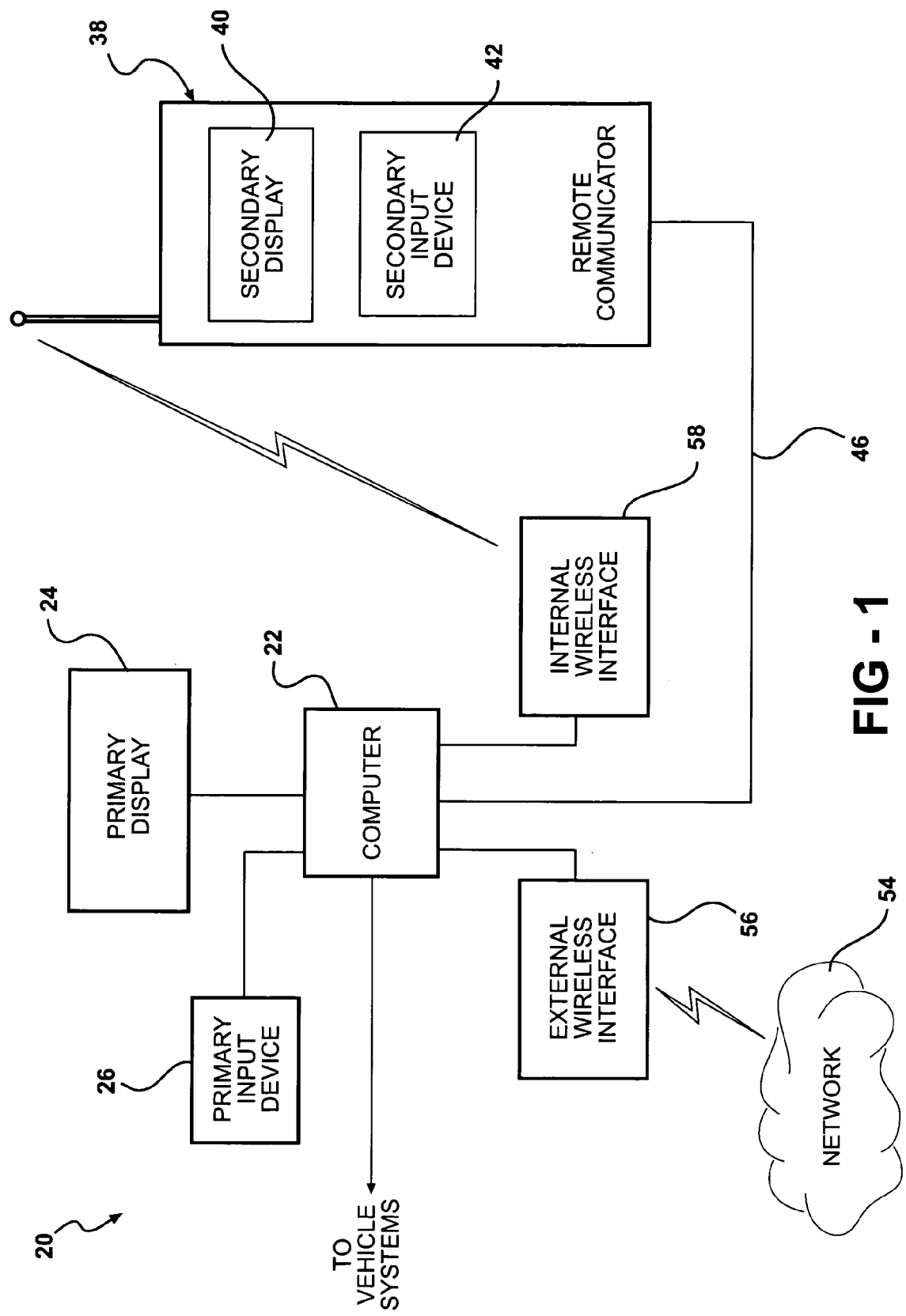
FIG. 1 is a schematic diagram of an information system for a vehicle.

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring to the Figures, wherein like numerals indicate like parts throughout the several views, an information system for a vehicle is shown at 20 in FIG. 1.

The system 20 includes a computer 22 for handling informational data, including vehicle data. The computer 22 preferably includes a main microprocessor to manage the receiving, storing, sending, calculating, and manipulating of the informational data. The computer 22 also includes other necessary electronic components known to those skilled in the art, such as a memory, a hard drive, communication interfaces, a power supply/converter, digital and analog converters, etc.

The computer 22 is connected to vehicle systems that provide the vehicle data which corresponds to the operation of the vehicle and associated vehicle systems. Examples of these vehicle systems include, but are not limited to, an engine controller, a climate control system, an integrated cellular phone system, a sound system (radio), a global positioning system (GPS) receiver, and a video entertainment center (such as a DVD player). Examples of vehicle data provided by the vehicle systems include, but are not limited to vehicle speed, engine RPMs, engine oil pressure, engine coolant temperature, battery voltage, vehicle maintenance reminders, climate control system settings, outside temperature, radio settings, integrated cellular phone settings, compass headings, video images, sound files, digital radio broadcasts, and navigational information.

The informational data handled by the computer 22 also includes external data from a network 54 external to the vehicle. An external wireless interface 56 is operatively connected to the computer 22 to communicate with the network 54 for sending and receiving the external data. The external data includes, but is not limited to internet web pages, e-mail, and navigational information.

Figure 2:
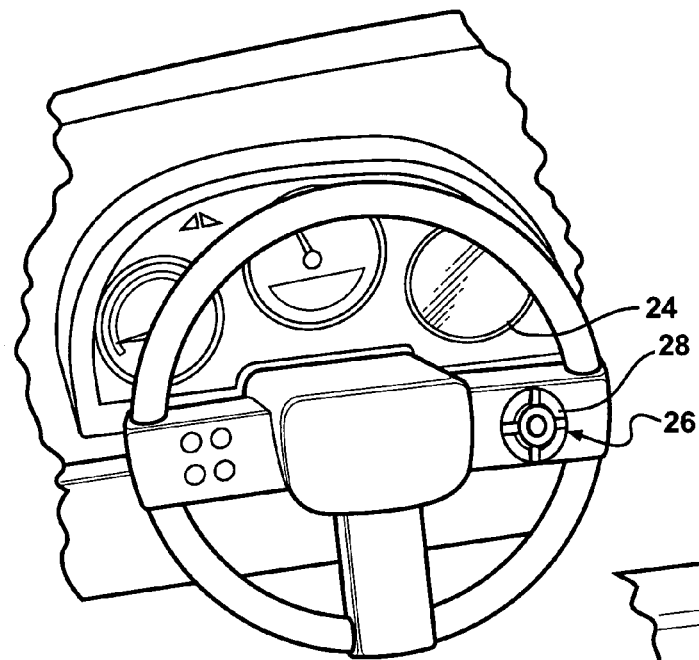
FIG. 2 is a perspective view of a drivers position in the vehicle including a primary display and a primary input device.

Referring now to FIG. 2, a primary display 24 is permanently affixed to the vehicle in a position to be viewed by a driver of the vehicle. Although the primary display 24 is shown in FIG. 2 as part of an instrument panel, the primary display 24 could be implemented in other locations, such as on a dashboard, a sun visor, or projected on a windshield as a "heads-up" display.

The primary display 24 is operatively connected to the computer 22 for displaying the informational data to the driver of the vehicle. A primary input device 26 is also operatively connected to the computer 22. The primary input device 26 allows the driver, or other occupant of the vehicle, to send commands to the computer 22. The driver or other occupant also uses the primary input device 26 to control the primary display 14, including changing the informational data that is displayed to the driver.

Figure 3:
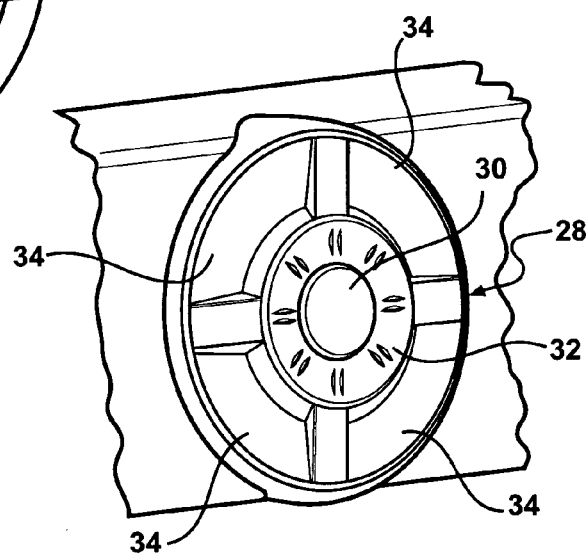
FIG. 3 is a perspective view of the primary input device implemented as a primary switch.
Figure 4:
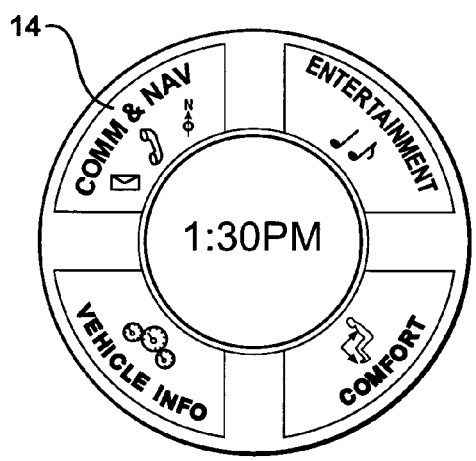
FIG. 4 is a view of a main menu displayed on the primary display.
Figure 5:
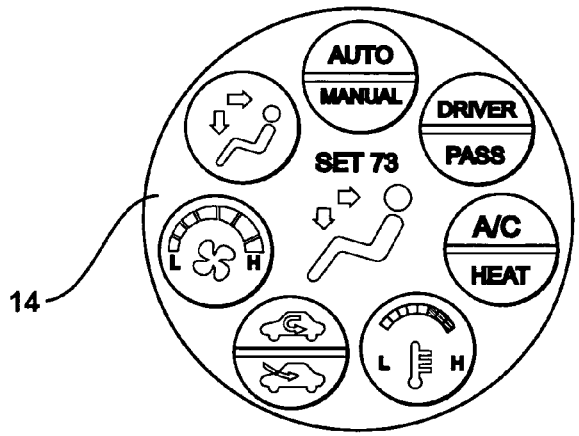
FIG. 5 is a view of a sub menu displayed on the primary display.

A primary switch 28 may be implemented as the primary input device 26. The primary switch may be mounted on the steering wheel, the dashboard, or other suitable locations within the vehicle. Referring now to FIG. 3, the primary switch 28 preferably includes a pushbutton 30, a rotary thumbwheel 32, and a plurality of mode switches 34. The pushbutton 30, rotary thumbwheel 32, and plurality of mode switches 34 are used in conjunction with one another to allow the driver, or other occupant, to navigate and control the primary display 24. For example, each of the plurality of mode switches may correspond to a category of vehicle systems. Examples of these categories could include "Vehicle Information", "Comfort", "Entertainment", and "Communication and Navigation". These categories may appear on the primary display 24, as shown in FIG. 4. Each mode switch 34 is preferably color-coded to match colors of the categories shown on the primary display 24. When one of the mode switches, such as "Comfort", is depressed, the primary display 24 changes to show the detailed settings for that category, as exemplified in FIG. 5. The rotary thumbwheel 32 is then used to navigate through the detailed settings. Selection of a particular detailed setting is accomplished by depressing the pushbutton 30.

Alternatively, the primary input device 26 may be implemented as a touchscreen interface (not shown). Touchscreen interfaces are well known to those skilled in the art. Typically, a transparent layer consisting of a resistive or a capacitive material is placed over a display, such as the primary display 24 of the subject invention. The driver or other occupant taps the layer, with a finger or a stylus, to select an item shown on the primary display 24. The touchscreen interface then determines the location of tapped selection and sends location coordinates to the computer 22. The computer 22 correlates the coordinates with the images shown on the primary display 24 to determine what has been selected.

Those skilled in the art appreciate that other implementations of the primary input device 26, other than the primary switch 28 and touchscreen interface described above, are possible. These other implementations include, but are not limited to, a keypad, a keyboard, and a speech recognition system.

Figure 6:
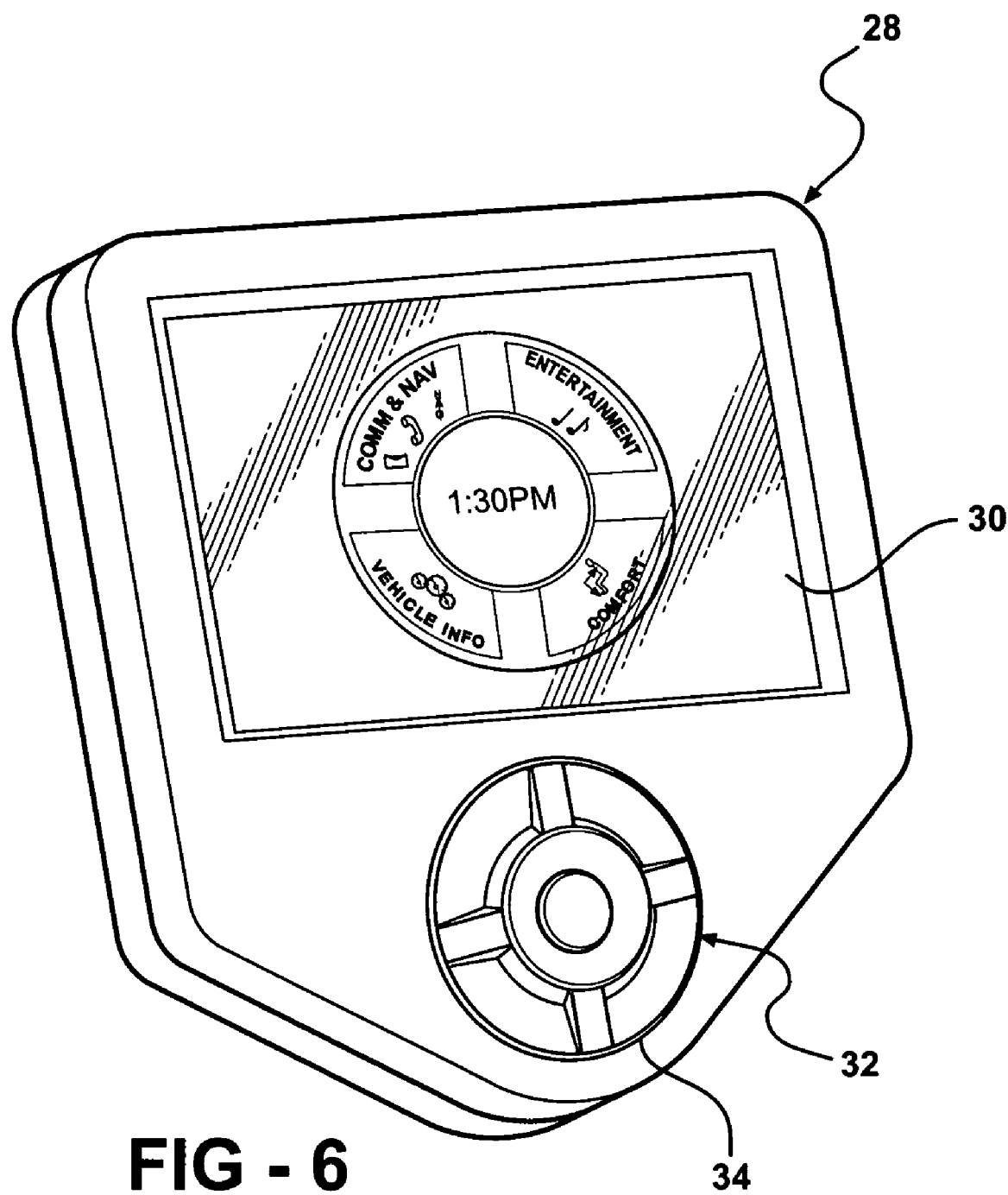
FIG. 6 is a perspective view of a remote communicator including a secondary display and a secondary input device.

The system 20 also includes a remote communicator 38 operatively connected to the computer 22. The remote communicator 38, shown in FIG. 6, is movable about the vehicle for use by the driver or the other occupants of the vehicle. The remote communicator includes a secondary display 40 for displaying the informational data to the driver or the other occupants. The secondary display 40 can display the same informational data as is available on the primary display 24 with the same formatting.

The remote communicator 38 also includes a secondary input device 42 for sending commands to the computer 22 and controlling the secondary display 40. The secondary input device 42 is analogous to the primary input device 26. It is preferred that the secondary input device 42 be implemented as a secondary switch 44. As with the primary switch 28, the secondary switch 44 preferably includes the pushbutton 20, the rotary thumbwheel 22, and the plurality of mode switches 24. Operation with the secondary switch 44 is comparable to operation of the primary switch 28 described above. Alternatively, the secondary input device 42 may be implemented as the touchscreen interface as described above, or any other suitable implementation.

The secondary input device 32 of the remote communicator 28 is also programmed to allow control of the primary display 14. This allows occupants of the vehicle to manipulate the informational data that is displayed to the driver. For example, the occupant could operate the remote communicator 28 to find navigational information, such as directions to a particular destination. Once the directions are located, the occupant can transfer the directions to the primary display 14. This allows the driver of the vehicle to focus his or her concentration on the task of driving, instead of looking up directions. Alternatively, the occupant of the vehicle could use the remote communicator 28 to find several restaurants and their locations superimposed on a map. The occupant could then send this map to the primary display 14, allowing the driver to choose a restaurant and drive to its location.

The computer 22 and remote communicator 38 are programmable to prevent certain informational data from being displayed on the secondary display 40 or manipulated with the secondary input device 42. For example, the driver of the vehicle could prevent the occupant using the remote communicator 38 from changing radio stations, altering climate controls, etc.

Figure 7:
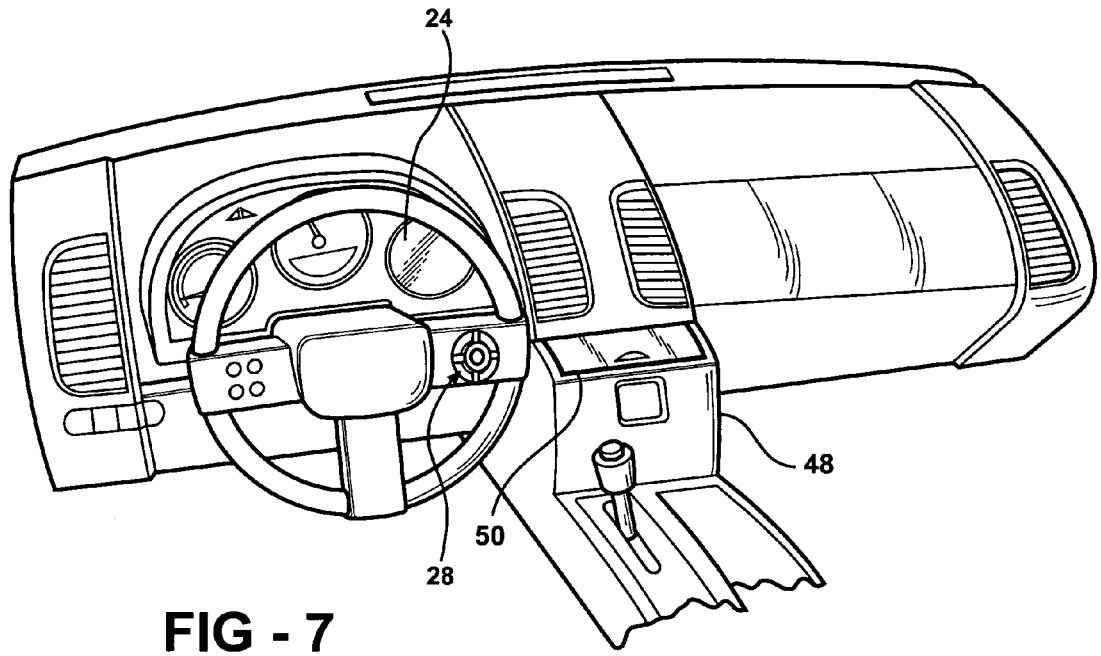
FIG. 7 is a perspective view of a dashboard of the vehicle including a storage compartment for the remote communicator.

Referring to FIG. 7, the vehicle also includes a storage compartment 48 for storage of the remote communicator 38. The storage compartment is preferably located in a center console of the vehicle. The storage compartment 48 includes a first configuration for completely concealing the remote communicator 38 when not in use. The storage compartment 48 includes a lid 50 to cover and conceal the remote communicator 38 while in the first configuration. The lid may be opened manually or by an automatic mechanism (not shown).

Figure 8:
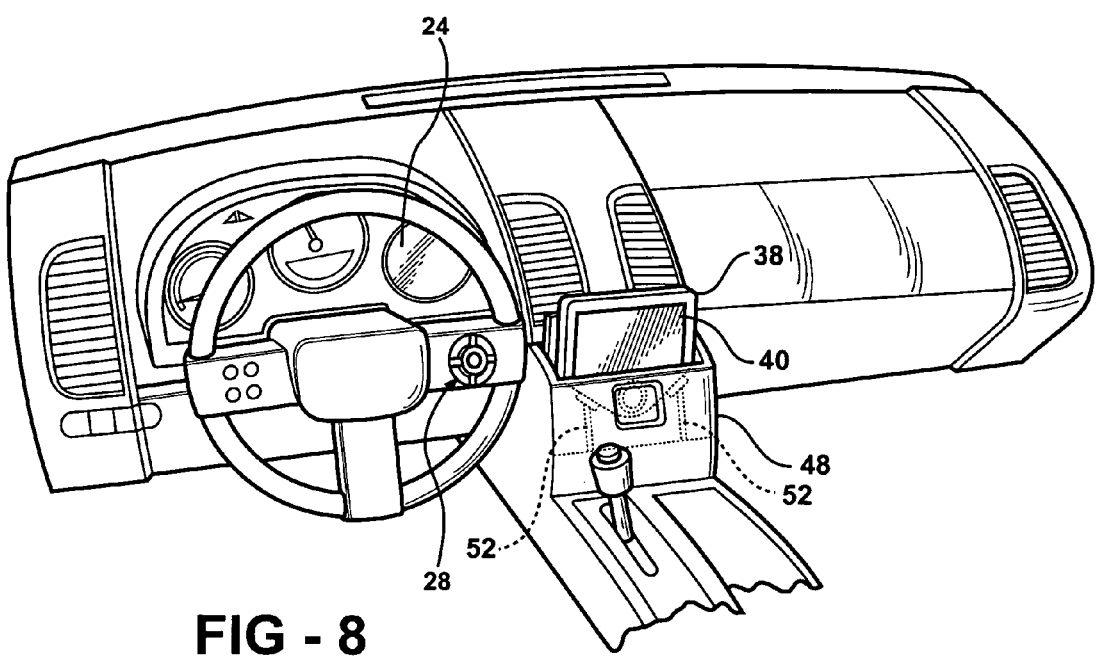
FIG. 8 is a perspective view of the dashboard of the vehicle including the remote communicator in a position such that the secondary display may be viewed.

The storage compartment 48 also includes a second configuration. In this second configuration, the remote communicator 38 is held in a position that allows viewing of the secondary display 40, as shown in FIG. 8. It is preferred that the storage compartment 48 include a lifting apparatus 52 for moving the remote communicator 28 between the first configuration and the second configuration. The lifting apparatus 52 may be manually or automatically operable.

In addition to controlling the primary display 24, the primary input device 26 is also programmed to control the secondary display 40 of the remote communicator 38. This is especially beneficial when the remote communicator is housed in the storage compartment 48 in its second configuration, where the secondary display 40 is viewable. The driver of the vehicle can then use the secondary display 40 as a supplement to the primary display 40. For example, the drive could set the primary display 24 to show climate control settings, while having the secondary display 40 show radio control information.

Figure 9:
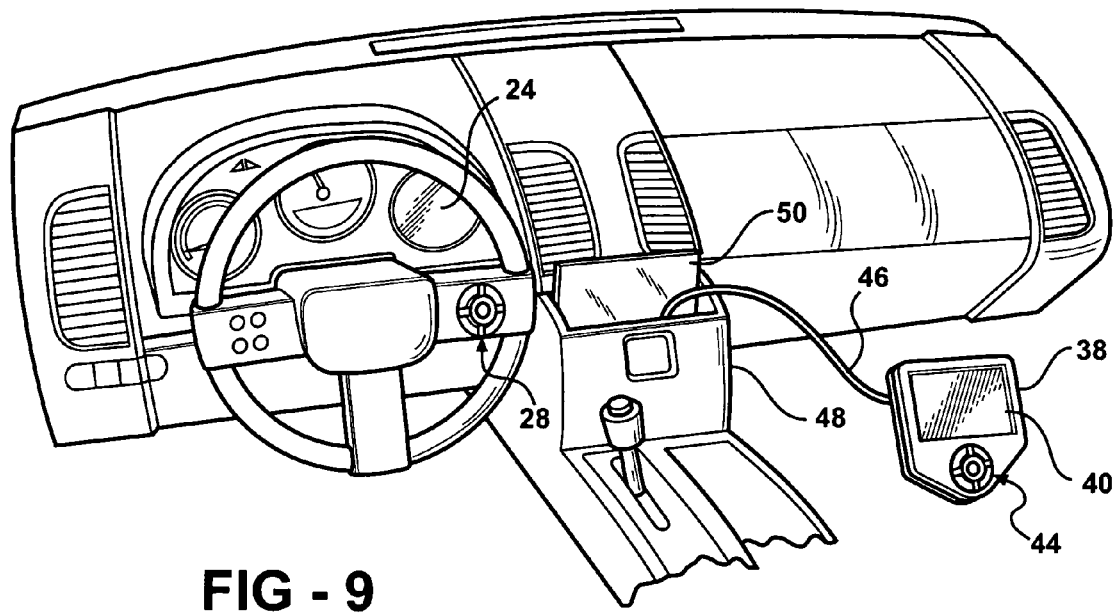
FIG. 9 is a perspective view showing the remote communicator connected via a cable.
Figure 10:
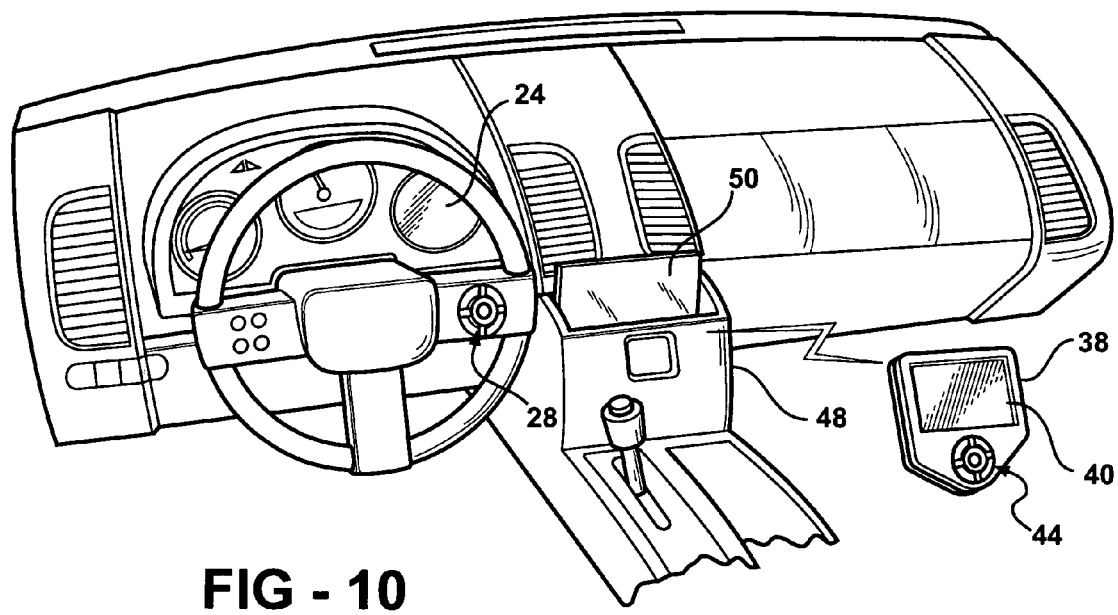
FIG. 10 is a perspective view showing the remote communicator connected via an internal wireless interface.

Numerous devices may be used to operatively connect the remote communicator 28 to the computer 12. One possible device, as shown in FIG. 9, is a cable 46 to physically "hardwire" the remote communicator 28 to the computer 12 for transferring the informational data. Those skilled in the art realize the cable 36 may carry the informational data via electrical or optical signals. A second possible device is preferred to operatively connect the remote communication 28 and the computer 12. The second possible device is an internal wireless interface. The internal wireless interface links the remote communicator 28 to the computer without the use of a physical interface, as shown in FIG. 10. Preferably, the remote communicator 28 and the computer 12 are both outfitted with radio transceivers (not shown). The radio transceivers communicate the informational data to one another using radio waves. Alternatively, optical transceivers can be implemented to communicate using waves in the optical spectrum. Suitable protocols include, but are not limited to, Bluetooth, 802.11, and IRDA.

In another exemplary embodiment of the invention, a plurality of remote communicators, similar to remote communicator 28 could be used in a single vehicle to allow more than one vehicle occupant to control individual settings for comfort. A network of remote communicators could be disposed in the vehicle, each communicating with a computer, similar to computer 22. Each remote communicator could be individually received in a storage compartment defined in the passenger compartment of the vehicle, similar to storage compartment 48.

Each of the plurality of remote communicators could communicate with the computer in such a way that the computer can distinguish communications from each of the plurality of remote communicators. For example, in a wireless embodiment, each of the plurality of remote communicators could emit signals at a different wavelength. Alternatively, in a wired embodiment, each of the plurality of remote communicators could be plugged into different terminals.

Each of the plurality of remote communicators can be operable to control operations associated with a particular portion of the vehicle passenger compartment. For example, a remote communicator generally positioned in back seat, driver side, could be operable to only control operations affecting the back seat, driver side, of the vehicle. Furthermore, by way of example and not limitation, the exemplary remote communicator could control operations such as volume of sounds emanating from a speaker generally disposed adjacent the back seat, driver side, of the vehicle. Other operations could include, but are not limited to, control over closeable vent, control over a fan directing air to back seat, driver side, and control over a light operable to direct light toward the back seat, driver side.

In other embodiments of the invention, each of the plurality of remote communicators could be operable to control operations associated with a particular portion of the vehicle passenger compartment and control operations for other portions of the vehicle passenger compartment, including controlling substantially all operations associated of the entire vehicle passenger compartment. However, the computer could be programmable to selectively limit the operability of a single remote communicator to control any particular operation. For example, if a first vehicle occupant, such as a child, is controlling operations for a remote portion of the vehicle passenger compartment in an undesirable manner, the driver could engage the computer to restrict the control exercised by the first vehicle occupant.

Figure 11:
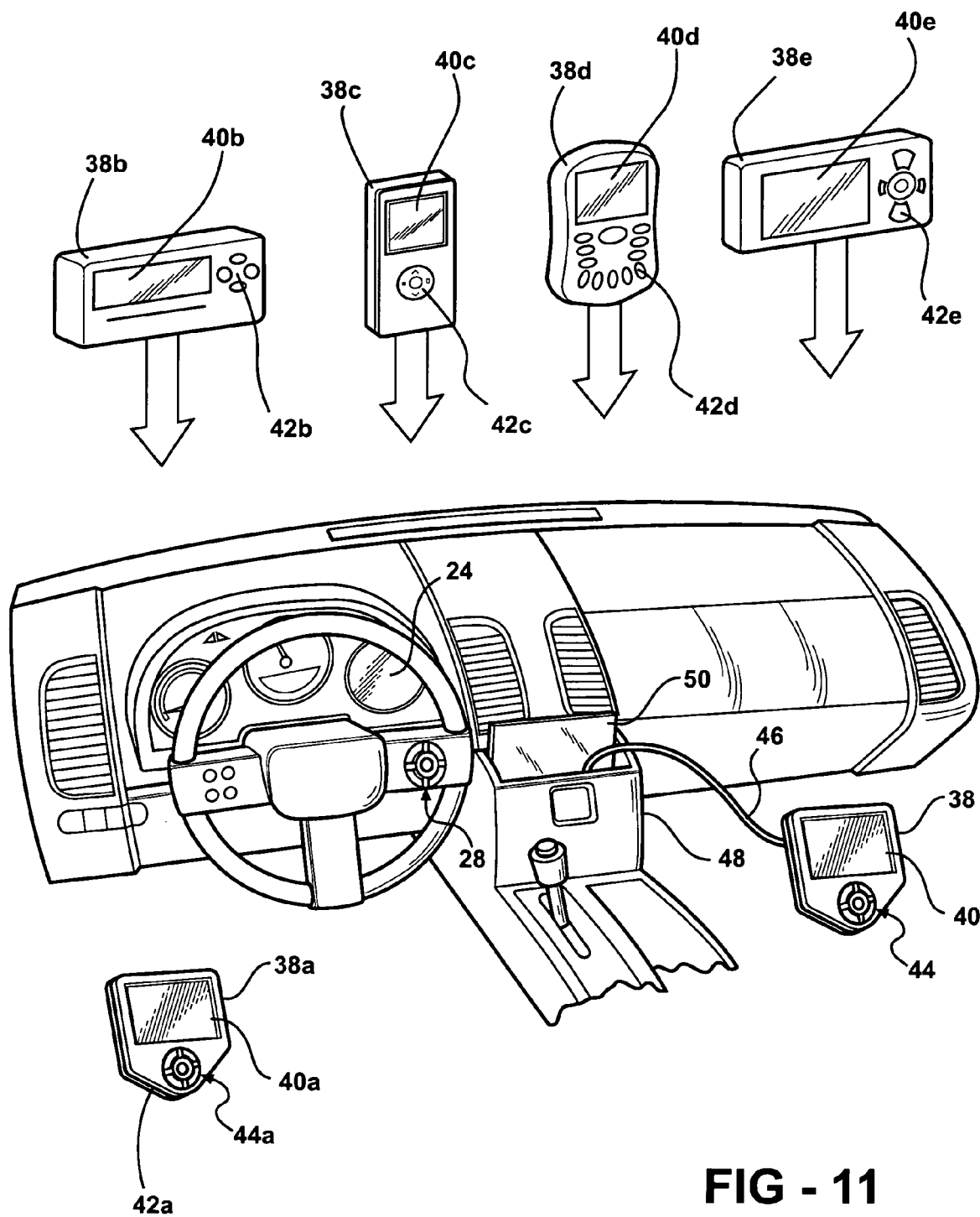
FIG. 11 is a perspective view showing a plurality of remote communicators communicating with a computer in one embodiment of the invention.

FIG. 11 shows an embodiment of the invention with a plurality of remote communicators 38, 38a, 38b, 38c, 38d, 38e. Each remote communicator 38, 38a, 38b, 38c, 38d, 38e includes a secondary display 40, 40a, 40b, 40c, 40d, 40e for changeably displaying the informational data to an occupant of the vehicle. Each remote communicator 38, 38a, 38b, 38c, 38d, 38e includes a secondary input device 42, 42a, 42b, 42c, 42d, 42e for sending commands to the computer, such as the computer 22 shown in FIG. 1, and controlling the respective secondary display 40, 40a, 40b, 40c, 40d, 40e. The respective secondary input devices 42, 42a, 42b, 42c, 42d, 42e are programmed to control the primary display 24 for manipulating the informational data that is displayed to the driver. The remote communicator 38 shown in FIG. 11 is substantially similar to the remote communicator 38 shown in FIG. 9 and described above. The remote communicator 38a shown in FIG. 11 is substantially similar to the remote communicator 38 shown in FIG. 10 and described above.

The remote communicator 38b is operable to display vehicle diagnostic data. The remote communicator 38b can show, with text or graphics, data corresponding to one or more of engine revolutions per minute, coolant temperature, and/or oil pressure. The remote communicator 38b may also be operable to tap into the control system to show other categories that are not traditionally shown, such as tire pressure and engine oil quality. The remote communicator 38b may also be operable to tap into the control system to show data that was previously acted on by the control system without communication to the driver, such as events that might cause a "check engine" light to illuminate. The remote communicator 38c is in the form of an MP3 player, such as an IPOD™. The remote communicator 38c is operable to communicate electronic files through first electrical communication receptacle 30c. The remote communicator 38d is in the form of a satellite radio receiver. The electronic peripheral device 42c is in the form of a navigation device. The electronic peripheral device 42c is operable to receive a global position of the vehicle. The remote communicators 38b, 38c, 38d, 38e are shown as communicating wirelessly with the computer to enhance the clarity of the drawing. Any of the remote communicators 38b, 38c, 38d, 38e can be arranged to communicate with the computer over a cable, such as cable 36.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle information system comprising:
   a computer for handling informational data including vehicle data corresponding to operation of a vehicle and associated vehicle systems;
   a primary display disposed in the vehicle in a position to be viewed by a driver of the vehicle and operatively connected to said computer for changeably displaying the informational data to the driver of the vehicle;
   a plurality of remote communicators operatively connected to said computer and movable about the vehicle;
   each of said remote communicators including a secondary display for changeably displaying the informational data to an occupant of the vehicle;
   each of said remote communicators also including a secondary input device for sending commands to said computer and controlling said secondary display; and
   said secondary input device being programmed to control said primary display for manipulating the informational data that is displayed to the driver.

2. The system as set forth in claim 1 further comprising:
   a primary input device positionable in the vehicle and operatively connected to said computer for sending commands to said computer for controlling said primary display.

3. The system as set forth in claim 1 further comprising:
   a storage compartment for storage of at least one of said plurality of remote communicators.

4. The system as set forth in claim 1 further comprising:
   a cable for linking at least one of said plurality of remote communicators to said computer for communication of the informational data.

5. The system as set forth in claim 1 further comprising:
   a wireless interface for linking at least one of said plurality of remote communicators to said computer for communication of the informational data.

6. The system as set forth in claim 1 further comprising:
   a cable for linking a first of said plurality of remote communicators to said computer for communication of the informational data; and
   a wireless interface for a second of said plurality of remote communicators to said computer for communication of the informational data.

* * * * *